(12) United States Patent
Kato et al.

(10) Patent No.: US 9,873,749 B2
(45) Date of Patent: *Jan. 23, 2018

(54) UNDER TREAD RUBBER COMPOSITION AND PNEUMATIC TIRE

(71) Applicant: THE YOKOHAMA RUBBER CO., LTD., Minato-ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,332

(22) PCT Filed: Dec. 19, 2014

(86) PCT No.: PCT/JP2014/083751
§ 371 (c)(1),
(2) Date: Nov. 15, 2016

(87) PCT Pub. No.: WO2015/173990
PCT Pub. Date: Nov. 19, 2015

(65) Prior Publication Data
US 2017/0073507 A1    Mar. 16, 2017

(30) Foreign Application Priority Data
May 16, 2014   (JP) ................ 2014-102239

(51) Int. Cl.
| C08C 19/22 | (2006.01) |
| C08F 8/30 | (2006.01) |
| C08K 3/04 | (2006.01) |
| C08K 5/32 | (2006.01) |
| B60C 1/00 | (2006.01) |
| C08L 7/00 | (2006.01) |
| C08L 15/00 | (2006.01) |

(52) U.S. Cl.
CPC ........... *C08C 19/22* (2013.01); *B60C 1/00* (2013.01); *C08F 8/30* (2013.01); *C08K 3/04* (2013.01); *C08K 5/32* (2013.01); *C08L 7/00* (2013.01); *C08L 15/00* (2013.01); *C08L 2205/03* (2013.01)

(58) Field of Classification Search
CPC .. C08C 19/22; C08K 3/04; C08K 5/32; C08F 8/30
See application file for complete search history.

(56) References Cited

U.S. PATENT DOCUMENTS

| 3,792,031 A | 2/1974 | Udding |
| 2006/0084730 A1 | 4/2006 | Fukushima et al. |
| 2007/0004869 A1* | 1/2007 | Parker ............ B60C 1/0016 525/331.9 |

FOREIGN PATENT DOCUMENTS

| JP | S47-25712 B1 | 7/1972 |
| JP | S48-16996 A | 3/1973 |
| JP | 2008-517071 A | 5/2008 |
| JP | 2008-208163 A | 9/2008 |
| JP | 2010-013541 A | 1/2010 |
| JP | 2013-032471 A | 2/2013 |

* cited by examiner

Primary Examiner — Peter D. Mulcahy
(74) Attorney, Agent, or Firm — Carrier Blackman & Associates, P.C.; Joseph P. Carrier; Anne G. Sabourin

(57) ABSTRACT

The present invention provides a rubber composition for an undertread, the rubber composition achieving excellent low heat build-up and high elastic modulus when formed into a tire; and a pneumatic tire that includes the rubber composition. The rubber composition for an undertread contains a diene rubber and a carbon black. The diene rubber contains a natural rubber and a modified polymer that is obtained by reacting a nitrone compound with a double bond of a conjugated diene polymer. The content of the natural rubber in the diene rubber is 60 mass % or greater, the content of the modified polymer in the diene rubber is from 8 to 40 mass %, the content of the carbon black is from 30 to 67 parts by mass per 100 parts by mass of the diene rubber, and the nitrogen adsorption specific surface area of the carbon black is from 20 to 60 m²/g.

19 Claims, 1 Drawing Sheet

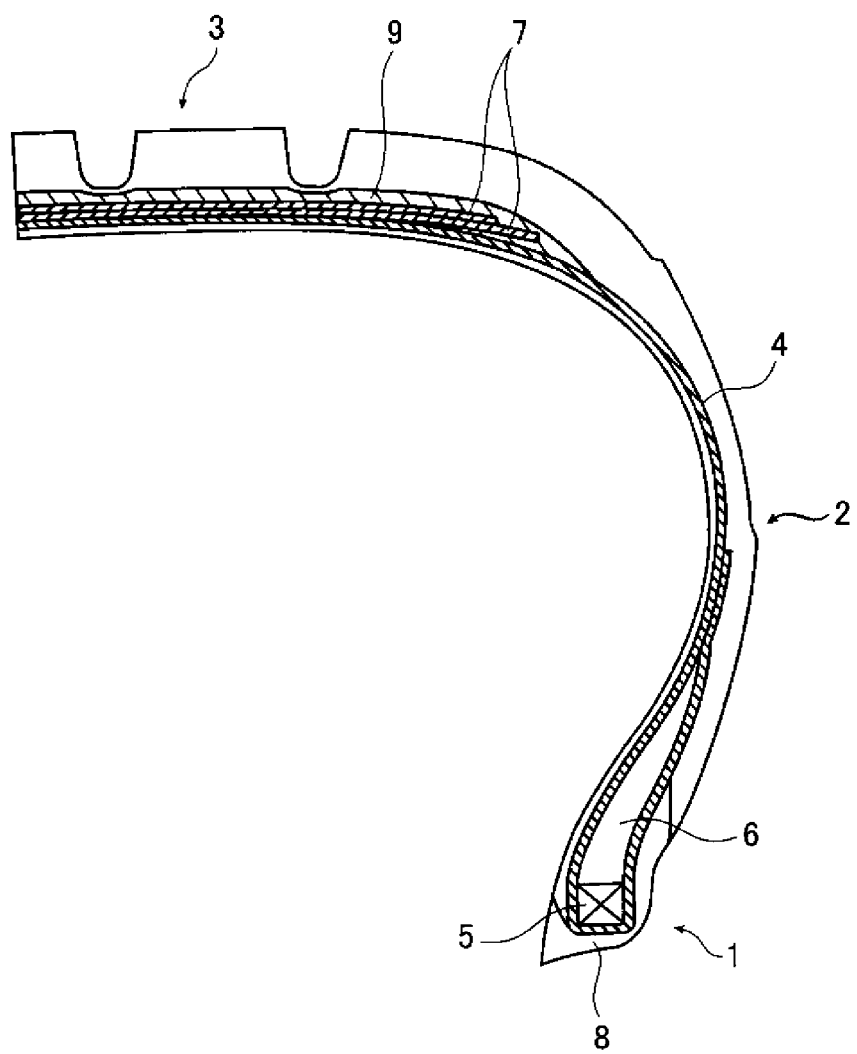

UNDER TREAD RUBBER COMPOSITION AND PNEUMATIC TIRE

TECHNICAL FIELD

The present invention relates to a rubber composition for an undertread and a pneumatic tire.

BACKGROUND ART

For an undertread, low heat build-up is an important physical property since the undertread is arranged in the tire interior, and thus the undertread readily builds up heat.

Furthermore, if the elastic modulus of the undertread is small, motion of adjacent parts becomes larger and the heat build-up of the tire may be deteriorated as a result. Therefore, elastic modulus needs to be fully considered.

In response to such required characteristics, for example, Patent Document 1 describes "a rubber composition for a tire undertread, the rubber composition comprising, per 100 parts by mass of a diene rubber, from 10 to 40 parts by mass of an oil-extended white clay, 15 parts by mass or greater of a carbon black, and from 1 to 10 parts by mass of a silica, a total compounded amount of the oil-extended white clay, the carbon black, and the silica being from 40 to 70 parts by mass" ([Claim 1]).

CITATION LIST

Patent Literature

Patent Document 1: Japanese Unexamined Patent Application Publication No. 2010-13541A

SUMMARY OF INVENTION

Technical Problem

Similarly to Patent Document 1, an object of the present invention is to provide a rubber composition for an undertread, the rubber composition achieving excellent low heat build-up and high elastic modulus when formed into a tire; and a pneumatic tire that includes the rubber composition.

Solution to Problem

As a result of diligent research to solve the above problems, the inventors of the present invention have found that the problems described above can be solved by using a natural rubber and a modified polymer that is obtained by modifying a conjugated diene polymer with a nitrone compound, together as a diene rubber, and using a carbon black having a particular nitrogen adsorption specific surface area, and thus completed the present invention.

Specifically, the inventors discovered that the object described above can be achieved by the following features.

[1] A rubber composition for an undertread, the rubber composition comprising: a diene rubber and a carbon black;

the diene rubber containing a natural rubber and a modified polymer that is obtained by reacting a nitrone compound with a double bond of a conjugated diene polymer;

a content of the natural rubber in the diene rubber being 60 mass % or greater;

a content of the modified polymer in the diene rubber being from 8 to 40 mass %;

a content of the carbon black being from 30 to 67 parts by mass per 100 parts by mass of the diene rubber; and a nitrogen adsorption specific surface area of the carbon black being from 20 to 60 m$^2$/g.

[2] The rubber composition for an undertread according to [1], where the conjugated diene polymer is at least one rubber selected from the group consisting of butadiene rubber and styrene-butadiene rubber.

[3] The rubber composition for an undertread according to [2], where a styrene unit content of the styrene-butadiene rubber is 30 mass % or less.

[4] The rubber composition for an undertread according to any one of [1] to [3], where the nitrone compound is a compound selected from the group consisting of
N-phenyl-α-(4-carboxyphenyl)nitrone,
N-phenyl-α-(3-carboxyphenyl)nitrone,
N-phenyl-α-(2-carboxyphenyl)nitrone,
N-(4-carboxyphenyl)-α-phenylnitrone,
N-(3-carboxyphenyl)-α-phenylnitrone, and
N-(2-carboxyphenyl)-α-phenylnitrone.

[5] The rubber composition for an undertread according to any one of [1] to [4], where a degree of modification of the modified polymer is from 0.02 to 4.0 mol %.

the degree of modification represents a proportion (mol %) of double bonds modified with the nitrone compound relative to double bonds originating from conjugated diene of the conjugated diene polymer.

[6] The rubber composition for an undertread according to any one of [1] to [5], where an amount of the nitrone compound that is reacted with the double bond of the conjugated diene polymer is from 0.1 to 10 parts by mass per 100 parts by mass of the diene rubber.

[7] A pneumatic tire wherein the rubber composition described in any one of [1] to [6] is used in an undertread.

Advantageous Effects of Invention

As described below, according to the present invention, a rubber composition for an undertread, the rubber composition achieving excellent low heat build-up and high elastic modulus when formed into a tire; and a pneumatic tire that includes the rubber composition can be provided.

BRIEF DESCRIPTION OF DRAWINGS

FIG. 1 is a partial cross-sectional schematic view of a tire that illustrates one embodiment of a pneumatic tire of the present invention.

DESCRIPTION OF EMBODIMENT

The rubber composition for an undertread of the present invention and the pneumatic tire of the present invention will be described below.

In this specification, a numerical range represented using "(from) . . . to . . . " refers to a range including the numerical values stated before and after the " . . . to . . . " as a lower limit value and an upper limit value.

Rubber Composition for Undertread

The rubber composition for an undertread of the present invention (hereinafter, also referred to as "rubber composition of the present invention") contains a diene rubber and a carbon black.

Note that the diene rubber contains a natural rubber and a modified polymer that is obtained by reacting a nitrone compound with a double bond of a conjugated diene polymer. The content of the natural rubber in the diene rubber is 60 mass % or greater, and the content of the modified polymer in the diene rubber is from 8 to 40 mass %.

Furthermore, the content of the carbon black is from 30 to 67 parts by mass per 100 parts by mass of the diene rubber, and the nitrogen adsorption specific surface area of the carbon black is from 20 to 60 m²/g.

It is conceived that the rubber composition of the present invention achieves excellent low heat build-up and high elastic modulus since the rubber composition has such a configuration.

As described above, the rubber composition of the present invention contains a modified polymer that is obtained by modifying a conjugated diene polymer with a nitrone compound.

Because of this, the nitrone-modified moiety of the modified polymer interacts with the carbon black in the composition (also interacts with the silica in the composition in the case where the composition contains a silica) and enhances dispersibility of the carbon black (also enhances dispersibility of the silica in the composition in the case where the composition contains a silica). As a result, the Payne effect is reduced, which is thought to yield excellent low heat build-up when formed into a tire.

Furthermore, it is conceived that, since the nitrone-modified moiety of the modified polymer interacts with the carbon black in the composition (also interacts with the silica in the composition in the case where the composition contains a silica), the number of crosslinking moiety is increased by formation of a strong bond between the rubber component and the carbon black, thereby increasing the crosslinking density and achieving high elastic modulus as a result.

Each of the components contained in the rubber composition of the present invention will be described in detail below.

Diene Rubber

The diene rubber contained in the rubber composition of the present invention contains a natural rubber and a modified polymer that is obtained by modifying a conjugated diene polymer with a nitrone compound. Note that the content of the natural rubber in the diene rubber is 60 mass % or greater, and the content of the modified polymer in the diene rubber is from 8 to 40 mass %.

The diene rubber may contain another rubber component except the natural rubber and the modified polymer described above. Such another rubber component is not particularly limited, and examples thereof include an isoprene rubber (IR), butadiene rubber (BR), styrene butadiene-rubber (SBR), acrylonitrile-butadiene copolymer rubber (NBR), butyl rubber (IIR), halogenated butyl rubber (Br-IIR, Cl-IIR), chloroprene rubber (CR), and the like. Among these, a butadiene rubber (BR) and styrene-butadiene rubber (SBR) are preferable.

Natural Rubber

As described above, the diene rubber contained in the rubber composition of the present invention contains a natural rubber.

The content of the natural rubber in the diene rubber is not particularly limited as long as the content is 60 mass % or greater; however, from the perspectives of achieving excellent fatigue resistance and enhancing durability of the tire, the content is preferably from 65 to 85 mass %.

Modified Polymer

As described above, the diene rubber contained in the rubber composition of the present invention contains a modified polymer that is obtained by modifying a conjugated diene polymer with a nitrone compound.

Conjugated Diene Polymer

The conjugated diene polymer used in the production of the modified polymer is not particularly limited. Specific examples thereof include a natural rubber (NR), isoprene rubber (IR), butadiene rubber (BR), styrene-butadiene rubber (SBR), acrylonitrile-butadiene copolymer rubber (NBR), butyl rubber (IIR), halogenated butyl rubber (Br-IIR, Cl-IIR), chloroprene rubber (CR), and the like.

Among these, a butadiene rubber (BR) and styrene-butadiene rubber (SBR) are preferable. That is, the modified polymer is preferably a modified polymer obtained by reacting a nitrone compound with a double bond of the butadiene rubber and/or the styrene-butadiene rubber.

Note that the styrene unit content of the styrene-butadiene rubber, which is a preferable example of the conjugated diene polymer, is not particularly limited; however the styrene unit content is preferably 30 mass % or less. In particular, the styrene unit content is more preferably 18 mass % or less. Note that the styrene unit content of the styrene-butadiene rubber indicates the proportion (mass %) of the styrene monomer units in the styrene-butadiene rubber.

Nitrone Compound

The nitrone compound used in the production of the modified polymer is not particularly limited as long as the nitrone compound is a compound having a nitrone group represented by Formula (1) below.

[Chemical Formula 1]

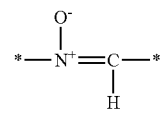

Formula (1)

In Formula (1), * indicates a bonding position.

The nitrone compound described above is preferably a compound represented by Formula (2) below.

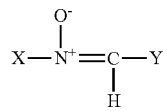

Formula (2)

In Formula (2), X and Y each independently represent an aliphatic hydrocarbon group, an aromatic hydrocarbon group, or an aromatic heterocyclic group which may have substituents.

Examples of the aliphatic hydrocarbon group represented by X or Y include alkyl groups, cycloalkyl groups, and alkenyl groups. Examples of the alkyl groups include methyl groups, ethyl groups, n-propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, n-hexyl groups, n-heptyl groups, and n-octyl groups. Among these, alkyl groups having from 1 to 18 carbons are preferable, and alkyl groups having from 1 to 6 carbons are more preferable. Examples of the cycloalkyl groups include cyclopropyl groups, cyclobutyl groups, cyclopentyl groups, and cyclohexyl groups. Among these, cycloalkyl groups having from 3 to 10 carbons are preferable, and cycloalkyl groups having from 3 to 6 carbons are more preferable. Examples of the alkenyl groups include vinyl groups, 1-propenyl groups, allyl groups, isopropenyl groups, 1-butenyl groups, and 2-butenyl groups. Among these, alkenyl groups having from 2 to 18 carbons are preferable, and alkenyl groups having from 2 to 6 carbons are more preferable.

Examples of the aromatic hydrocarbon group represented by X or Y include aryl groups, and aralkyl groups.

Examples of the aryl groups include phenyl groups, naphthyl groups, anthryl groups, phenanthryl groups, and biphenyl groups. Among these, aryl groups having from 6 to 14 carbons are preferable, aryl groups having from 6 to 10 carbons are more preferable, and a phenyl group and a naphthyl group are even more preferable.

Examples of the aralkyl groups include benzyl groups, phenethyl groups, and phenylpropyl groups. Among these, aralkyl groups having from 7 to 13 carbons are preferable, aralkyl groups having from 7 to 11 carbons are more preferable, and a benzyl group is even more preferable.

Examples of the aromatic heterocyclic group represented by X or Y include pyrrolyl groups, furyl groups, thienyl groups, pyrazolyl groups, imadazolyl groups (imadazol groups), oxazolyl groups, isooxazolyl groups, thiazolyl groups, isothiazolyl groups, pyridyl groups (pyridine groups), furan groups, thiophene groups, pyridazinyl groups, pyrimidinyl groups, and pyradinyl groups. Among these, pyridyl groups are preferable.

The substituents of the group represented by X or Y are not particularly limited, and examples thereof include alkyl groups having from 1 to 4 carbons, hydroxy groups, amino groups, nitro groups, carboxy groups, sulfonyl groups, alkoxy groups, and halogen atoms. Among these, carboxy groups are preferable.

Note that examples of the aromatic hydrocarbon group having such a substituent include aryl groups having a substituent, such as a tolyl group and xylyl group; and aralkyl groups having a substituent, such as a methylbenzyl group, ethylbenzyl group, and methylphenethyl group.

The compound represented by Formula (2) above is preferably a compound represented by Formula (3) below.

[Chemical Formula 3]

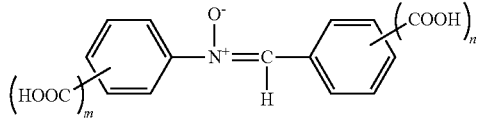

Formula (3)

In Formula (3), m and n each independently represent an integer from 0 to 5, and the sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

The carboxynitrone represented by Formula (3) is not particularly limited but is preferably a compound selected from the group consisting of N-phenyl-α-(4-carboxyphenyl)nitrone represented by Formula (3-1) below, N-phenyl-α-(3-carboxyphenyl)nitrone represented by Formula (3-2) below,
N-phenyl-α-(-2-carboxyphenyl)nitrone represented by Formula (3-3) below, N-(-4-carboxyphenyl)-α-phenylnitrone represented by Formula (3-4) below,
N-(-3-carboxyphenyl)-α-phenylnitrone represented by Formula (3-5) below, and N-(2-carboxyphenyl)-α-phenylnitrone represented by Formula (3-6) below.

[Chemical Formula 4]

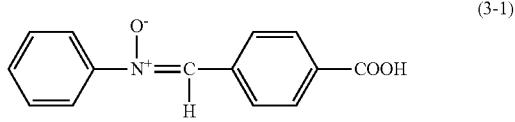

(3-1)

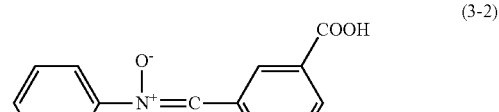

(3-2)

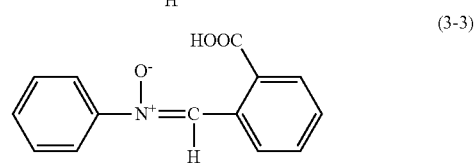

(3-3)

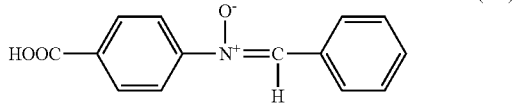

(3-4)

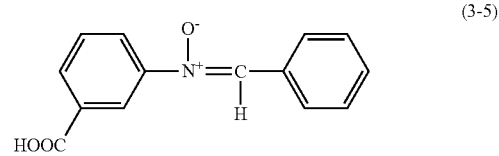

(3-5)

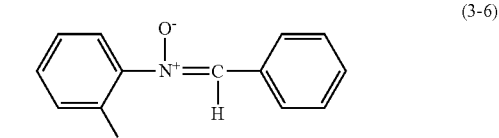

(3-6)

The method of synthesizing the nitrone compound is not particularly limited, and conventionally known methods can be used. For example, a nitrone compound having a nitrone group is obtained by stirring a compound having a hydroxyamino group (—NHOH) and a compound having an aldehyde group (—CHO) at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for 1 to 24 hours to allow the both groups to react, thereby yielding a nitrone compound having a nitrone group.

Method for Producing Modified Polymer

The method for producing a modified polymer by reacting a nitrone compound with double bonds of a conjugated diene polymer is not particularly limited, but an example thereof is a method of mixing the conjugated diene polymer described above and the nitrone compound described above for 1 to 30 minutes at 100 to 200° C.

At this time, a cycloaddition reaction occurs between the double bonds originating from conjugated diene in the conjugated diene polymer and the nitrone groups of the nitrone compound, forming a five-membered ring as illustrated in Formula (4) or Formula (5) below. Note that Formula (4) below represents a reaction between a 1,4 bond and a nitrone compound, and Formula (5) below represents a reaction between a 1,2-vinyl bond and a nitrone compound. In addition, Formulas (4) and (5) represent reactions for cases in which the conjugated diene is butadiene (1,3-butadiene), but five-membered rings may also be formed by the same reactions when the conjugated diene is a compound other than butadiene.

[Chemical Formula 5]

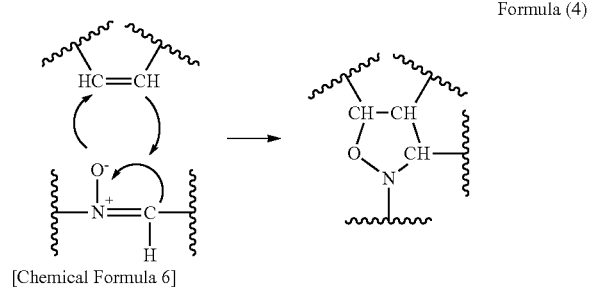

Formula (4)

[Chemical Formula 6]

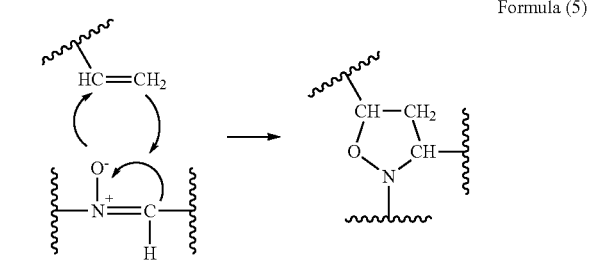

Formula (5)

The amount of the nitrone compound reacted with the double bonds of the conjugated diene polymer is not particularly limited but is preferably from 0.1 to 10 parts by mass, and more preferably from 0.3 to 5 parts by mass, per 100 parts by mass of the conjugated diene polymer.

Degree of Modification

The degree of modification of the modified polymer is not particularly limited but is preferably from 0.02 to 4.0 mol % and more preferably from 0.10 to 2.0 mol %.

Here, "degree of modification" refers to a proportion (mol %) of double bonds modified with the nitrone compound relative to all the double bonds of conjugated diene contained in the conjugated diene polymer, and more specifically refers to a proportion (mol %) of the structure of Formula (4) above or Formula (5) above that is formed due to the modification with the nitrone compound. The degree of modification, for example, can be determined by NMR measurement of the conjugated diene polymer and the modified polymer (that is, the polymers before and after modification).

Note that in this specification, a modified polymer having a degree of modification of 100 mol % falls under the category of a diene rubber.

The content of the modified polymer in the diene rubber is not particularly limited as long as the content is from 8 to 40 mass %; however, from the perspective of achieving even higher levels of both the low heat build-up and high elasticity at the same time when a tire is formed, the content is preferably from 10 to 35 mass %, and more preferably from 15 to 30 mass %.

Carbon Black

The carbon black contained in the rubber composition of the present invention is not particularly limited as long as the carbon black has a nitrogen adsorption specific surface area of 20 to 60 m$^2$/g.

Furthermore, the nitrogen adsorption specific surface area (N$_2$SA) of the carbon black is preferably 25 m$^2$/g or greater but less than 60 m$^2$/g, and more preferably from 30 to 50 m$^2$/g.

Note that the nitrogen adsorption specific surface area (N$_2$SA) is a value of the amount of nitrogen adsorbed to a surface of carbon black, measured in accordance with JIS K6217-2:2001 (Part 2: Determination of specific surface area—Nitrogen adsorption methods—Single-point procedures).

The content of the carbon black is from 30 to 67 parts by mass, preferably from 30 to 60 parts by mass, and more preferably from 30 to 50 parts by mass, per 100 parts by mass of the diene rubber.

Optional Components

The rubber composition of the present invention may contain another additive as necessary in a range that does not inhibit the object of the present invention.

Examples of the additive include various additives typically used in rubber compositions, such as fillers except the carbon black (e.g. silica), silane coupling agents, zinc oxide (zinc white), stearic acid, resins for adhesion, peptizing agents, antiaging agents, waxes, processing aids, aroma oils, liquid polymers, terpene-based resins, thermosetting resins, vulcanizing agents (e.g. sulfur), and vulcanization accelerators.

Method for Producing Rubber Composition

The method of producing the rubber composition of the present invention is not particularly limited, and specific examples thereof include a method whereby each of the above-mentioned components is kneaded using a publicly known method and device (e.g. Banbury mixer, kneader, roller, and the like). When the composition of the present invention contains a sulfur or a vulcanization accelerator, the components other than the sulfur and the vulcanization accelerator are preferably blended first at a high temperature (preferably from 40 to 160° C.) and then cooled before the sulfur or the vulcanization accelerator is blended.

In addition, the rubber composition of the present invention can be vulcanized or crosslinked under conventional, publicly known vulcanizing or crosslinking conditions.

Application

The rubber composition of the present invention is used in production of a pneumatic tire. In particular, the rubber composition is preferably used in a tire rim cushion or rubber finishing of a pneumatic tire.

Pneumatic Tire

The pneumatic tire of the present invention is a pneumatic tire that includes the rubber composition of the present invention described above. In particular, the pneumatic tire of the present invention is preferably a pneumatic tire that includes the rubber composition of the present invention in the undertread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread 3, a belt layer 7 is provided along the entire circumference of the tire on the outer side of the carcass layer 4. An undertread 9 is provided in a manner that the undertread 9 covers the belt layer 7.

Additionally, rim cushions 8 are provided in parts of the bead portions 1 that are in contact with a rim.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present invention will be further described in detail with reference to examples; however, the present invention is not limited thereto.

Synthesis of Nitrone Compound (Carboxynitrone)

In a 2 L eggplant-shaped flask, methanol heated to 40° C. (900 mL) was placed, and then terephthalaldehydic acid represented by Formula (b-1) below (30.0 g) was added and dissolved. In this solution, a solution in which phenylhydroxylamine represented by Formula (a-1) below (21.8 g) was dissolved in methanol (100 mL) was added and stirred at room temperature for 19 hours. After the completion of stirring, a nitrone compound (carboxynitrone) represented by formula (c-1) below was obtained by recrystallization from methanol (41.7 g). The yield was 86%.

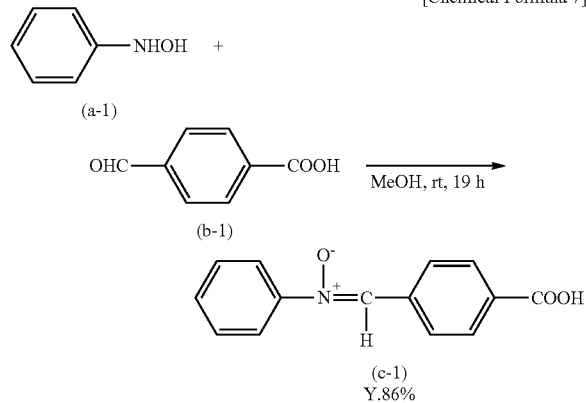

[Chemical Formula 7]

Synthesis of Modified Polymer (Modified BR 1)

To a Banbury mixer at 120° C., a butadiene rubber (Nipol BR1220, manufactured by Zeon Corporation) was added and masticated for 2 minutes. Thereafter, 1 part by mass of the nitrone compound synthesized as described above was added per 100 parts by mass of the butadiene rubber, and mixed at 155° C. for 6 minutes to modify the butadiene rubber with the nitrone compound. The modified polymer was obtained as described above. The obtained modified polymer was used as the modified BR 1.

When NMR analysis was performed for the obtained modified BR 1 to determine the degree of modification, the degree of modification of the modified BR 1 was 0.22 mol %. Specifically, the degree of modification was determined as described below. The degree of modification was determined by measuring the peak area (derived from two protons adjacent to the carboxy group) at around 8.08 ppm via $^1$H-NMR analysis (CDCl$_3$, 400 MHz, TMS) for the butadiene rubber before and after the modification, using CDCl$_3$ as a solvent. Note that the $^1$H-NMR analysis of the modified BR 1 was performed by using a sample obtained by dissolving the modified BR 1 in toluene, performing purification by methanol precipitation twice, and then drying under reduced pressure.

Synthesis of Modified Polymer (Modified BR 2)

The butadiene rubber was modified with the nitrone compound in the same manner as for the modified BR 1 except for changing the compounded amount of the nitrone compound from 1 part by mass to 2 parts by mass. The resulting modified polymer was used as the modified polymer 2.

When NMR analysis was performed for the obtained modified BR 2 to determine the degree of modification, the degree of modification of the modified BR 2 was 0.48 mol %. The manner of determining the degree of modification was as described above.

Synthesis of Modified Polymer (Modified SBR 1)

In a Banbury mixer at 120° C., an SBR (Nipol 1502, manufactured by Zeon Corporation) was added and masticated for 2 minutes. Thereafter, 1 part by mass of the carboxynitrone synthesized as described above was added per 100 parts by mass of the SBR, and mixed at 155° C. for 6 minutes to modify the SBR with the carboxynitrone. The obtained modified polymer was used as the modified SBR 1.

When the degree of modification was determined based on the peak area (derived from two protons adjacent to the carboxy group) at around 8.08 ppm by measuring $^1$H-NMR spectrum (CDCl$_3$, 400 MHz, TMS) for the SBR before and after the modification, the degree of modification of the modified SBR 1 was 0.20 mol %.

Synthesis of Carboxynitrone-Modified SBR (Modified SBR 2)

The SBR was modified with the carboxynitrone in the same manner as for the modified SBR 1 except for changing the compounded amount of the carboxynitrone from 1 part by mass to 2 parts by mass. The obtained modified polymer was used as the modified SBR 2.

When the degree of modification was determined based on the peak area (derived from two protons adjacent to the carboxy group) at around 8.08 ppm by measuring $^1$H-NMR spectrum (CDCl$_3$, 400 MHz, TMS) for the SBR before and after the modification, the degree of modification of the modified SBR 2 was 0.39 mol %.

Comparative Examples 1 to 3 and Working Examples 1 to 9

Preparation of Rubber Composition

The components shown in Table 1 to Table 3 below were blended in the proportions (part by mass) shown in Table 1 to Table 3 below.

Specifically, the components shown in Table 1 to Table 3 below except for the sulfur and the vulcanization accelerator were first mixed in a Banbury mixer at 80° C. for 5 minutes. Thereafter, a roll was used to mix the sulfur and the vulcanization accelerator to obtain a rubber composition.

Production of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent tan δ (60° C.) was measured for each obtained vulcanized rubber sheet using a viscoelastic spectrometer (manufactured by Toyo Seiki Seisaku-sho, Ltd.) under the following conditions: 10% initial distortion, ±2% amplitude, 20 Hz frequency, and temperature of 60° C. The results thereof are shown in Table 1 to Table 3 below (heat build-up). The results were shown as follows: the results in Table 1 below were expressed as index values with tan δ (60° C.) of Comparative Example 1 defined as an index value of 100; the results in Table 2 below were expressed as index values with tan δ (60° C.) of Comparative Example 2 defined as an index value of 100; and the results in Table 3 below were expressed as index values with tan δ (60° C.) of Comparative Example 3 defined as an index of 100. Smaller index values indicate superior low heat build-up when formed into a tire.

Evaluation of Elastic Modulus

The obtained rubber composition was vulcanized at 150° C. for 15 minutes to prepare a vulcanized rubber composition.

Thereafter, the prepared vulcanized rubber composition was cut out into a dumbbell shape (No. 3 dumbbell shape) having a thickness of 2 mm and used as a test piece.

For the obtained test piece, 100% modulus (stress at 100% strain) [MPa] was measured by performing a test at a pulling rate of 500 mm/min in accordance with JIS K 6251. The results are shown in Table 1 to Table 3 below.

Note that the results were shown as follows: the results in Table 1 below were expressed as index values with 100% modulus (M100) of Comparative Example 1 defined as an index value of 100; the results in Table 2 below were expressed as index values with 100% modulus (M100) of Comparative Example 2 defined as an index value of 100; and the results in Table 3 below were expressed as index values with 100% modulus (M100) of Comparative Example 3 defined as an index value of 100. Larger index values indicate higher elastic modulus.

In Table 1 to Table 3 below, "CPN conversion value" indicates the amount in terms of part by mass of the nitrone compound used in the synthesis of the modified polymer relative to 100 parts by mass of the diene rubber.

Furthermore, in Table 1 to Table 3 below, "degree of modification" indicates the degree of modification of the modified polymer described above.

TABLE 1

|  | Comparative Example 1 | Working Example 1 | Working Example 2 | Working Example 3 |
|---|---|---|---|---|
| Natural rubber | 75.00 | 75.00 | 75.00 | 75.00 |
| BR | 25.00 | 10.00 | — | — |
| Modified BR 1 | — | 15.00 | 25.00 | — |
| Modified BR 2 | — | — | — | 25.00 |
| Carbon black 1 | 40.00 | 40.00 | 40.00 | 40.00 |
| Zinc oxide | 3.00 | 3.00 | 3.00 | 3.00 |
| Stearic acid | 1.00 | 1.00 | 1.00 | 1.00 |
| Anti-aging agent | 1.00 | 1.00 | 1.00 | 1.00 |
| Process oil | 5.00 | 5.00 | 5.00 | 5.00 |
| Vulcanization accelerator | 1.00 | 1.00 | 1.00 | 1.00 |
| Sulfur | 3.00 | 3.00 | 3.00 | 3.00 |
| Value in terms of CPN amount (parts by mass) | 0.00 | 0.15 | 0.25 | 0.50 |
| Modification conditions | — | 155° C. 6 min | 155° C. 6 min | 155° C. 6 min |
| Degree of modification (mol %) | — | 0.22 | 0.22 | 0.48 |
| Heat build-up | 100 | 96 | 93 | 89 |
| Elastic modulus (M100) | 100 | 111 | 114 | 113 |

TABLE 2

|  | Comparative Example 2 | Working Example 4 | Working Example 5 | Working Example 6 |
|---|---|---|---|---|
| Natural rubber | 75.00 | 75.00 | 75.00 | 75.00 |
| BR | 25.00 | 10.00 | — | — |
| Modified BR 1 | — | 15.00 | 25.00 | — |
| Modified BR 2 | — | — | — | 25.00 |
| Carbon black 2 | 40.00 | 40.00 | 40.00 | 40.00 |
| Zinc oxide | 3.00 | 3.00 | 3.00 | 3.00 |
| Stearic acid | 1.00 | 1.00 | 1.00 | 1.00 |
| Anti-aging agent | 1.00 | 1.00 | 1.00 | 1.00 |
| Process oil | 5.00 | 5.00 | 5.00 | 5.00 |
| Vulcanization accelerator | 1.00 | 1.00 | 1.00 | 1.00 |
| Sulfur | 3.00 | 3.00 | 3.00 | 3.00 |
| Value in terms of CPN amount (parts by mass) | 0.00 | 0.15 | 0.25 | 0.50 |
| Modification conditions | — | 155° C. 6 min | 155° C. 6 min | 155° C. 6 min |
| Degree of modification (mol %) | — | 0.22 | 0.22 | 0.48 |
| Heat build-up | 100 | 96 | 94 | 91 |
| Elastic modulus (M100) | 100 | 108 | 111 | 111 |

TABLE 3

|  | Comparative Example 3 | Working Example 7 | Working Example 8 | Working Example 9 |
|---|---|---|---|---|
| Natural rubber | 75.00 | 75.00 | 75.00 | 75.00 |
| SBR | 25.00 | 10.00 | — | — |
| Modified SBR 1 | — | 15.00 | 25.00 | — |
| Modified SBR 2 | — | — | — | 25.00 |
| Carbon black 1 | 40.00 | 40.00 | 40.00 | 40.00 |
| Zinc oxide | 3.00 | 3.00 | 3.00 | 3.00 |
| Stearic acid | 1.00 | 1.00 | 1.00 | 1.00 |
| Anti-aging agent | 1.00 | 1.00 | 1.00 | 1.00 |
| Process oil | 5.00 | 5.00 | 5.00 | 5.00 |
| Vulcanization accelerator | 1.00 | 1.00 | 1.00 | 1.00 |
| Sulfur | 3.00 | 3.00 | 3.00 | 3.00 |
| Value in terms of CPN amount (parts by mass) | 0.00 | 0.15 | 0.25 | 0.50 |
| Modification conditions | — | 155° C., 6 min | 155° C., 6 min | 155° C., 6 min |
| Degree of modification (mol %) | — | 0.20 | 0.20 | 0.39 |
| Heat build-up | 100 | 95 | 93 | 90 |
| Elastic modulus (M100) | 100 | 106 | 109 | 110 |

The details of the components shown in Table 1 to Table 3 above are as follows.
Natural rubber: TSR20
BR: Nipol BR1220 (manufactured by Zeon Corporation)
SBR: Nipol 1502 (manufactured by Zeon Corporation)
Modified BR 1: Modified BR 1 synthesized as described above
Modified BR 2: Modified BR 2 synthesized as described above
Modified SBR 1: Modified SBR 1 synthesized as described above
Modified SBR 2: Modified SBR 2 synthesized as described above
Carbon black 1: SEAST F (nitrogen adsorption specific surface area: 40 $m^2/g$, manufactured by Tokai Carbon Co., Ltd.)
Carbon black 2: SEAST V (nitrogen adsorption specific surface area: 27 $m^2/g$, manufactured by Tokai Carbon Co., Ltd.)
Zinc oxide: Zinc Oxide III (Seido Chemical Industry Co., Ltd.)
Stearic acid: Stearic acid YR (manufactured by NOF Corporation)
Anti-aging agent: SANTOFLEX 6PPD (manufactured by Soltia Europe)
Process oil: Extract No. 4 S (manufactured by Showa Shell Sekiyu K.K.)
Vulcanization accelerator: Nocceler CZ-G (manufactured by Ouchi Shinko Chemical Industrial Co., Ltd.)
Sulfur: oil treatment sulfur (manufactured by Karuizawa Refinery Ltd.)

As is clear from Table 1 to Table 3, all of Working Examples 1 to 9 which contained the modified polymer achieved excellent low heat build-up and high elastic modulus when formed into tires compared to those of Comparative Examples 1 to 3 which contained no modified polymer.

Furthermore, when Working Examples 1 to 3 are compared, it was found that even better low heat build-up was achieved when the introduced amount of the nitrone compound was greater. Similar tendency was observed from the comparison of Working Examples 4 to 6 and the comparison of Working Examples 7 to 9.

REFERENCE SIGNS LIST

1 Bead portion
2 Sidewall portion
3 Tire tread portion
4 Carcass layer
5 Bead core
6 Bead filler
7 Belt layer
8 Rim cushion
9 Undertread

The invention claimed is:

1. A rubber composition for an undertread, the rubber composition comprising: a diene rubber and a carbon black;
the diene rubber containing a natural rubber and a modified polymer that is obtained by reacting a nitrone compound having a carboxy group with a double bond of a conjugated diene polymer;
a content of the natural rubber in the diene rubber being 60 mass % or greater;
a content of the modified polymer in the diene rubber being from 8 to 40 mass %;
a content of the carbon black being from 30 to 67 parts by mass per 100 parts by mass of the diene rubber; and
a nitrogen adsorption specific surface area of the carbon black being from 20 to 60 $m^2/g$.

2. The rubber composition for an undertread according to claim 1, wherein the conjugated diene polymer is at least one rubber selected from the group consisting of butadiene rubber and styrene-butadiene rubber.

3. The rubber composition for an undertread according to claim 2, wherein a styrene unit content of the styrene-butadiene rubber is 30 mass % or less.

4. The rubber composition for an undertread according to claim 1, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

5. The rubber composition for an undertread according to claim 1, wherein a degree of modification of the modified polymer is from 0.02 to 4.0 mol %,
wherein "degree of modification" represents a proportion (mol %) of double bonds modified with the nitrone compound relative to all the double bonds originating from conjugated diene of the conjugated diene polymer.

6. The rubber composition for an undertread according to claim 1, wherein an amount of the nitrone compound that is reacted with the double bond of the conjugated diene polymer is from 0.1 to 10 parts by mass per 100 parts by mass of the diene rubber.

7. A pneumatic tire wherein the rubber composition described in claim 1 is used in an undertread.

8. The rubber composition for an undertread according to claim 2, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

9. The rubber composition for an undertread according to claim 3, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

10. The rubber composition for an undertread according to claim 2, wherein a degree of modification of the modified polymer is from 0.02 to 4.0 mol %,
wherein "degree of modification" represents a proportion (mol %) of double bonds modified with the nitrone compound relative to all the double bonds originating from conjugated diene of the conjugated diene polymer.

11. The rubber composition for an undertread according to claim 3, wherein a degree of modification of the modified polymer is from 0.02 to 4.0 mol %,
wherein "degree of modification" represents a proportion (mol %) of double bonds modified with the nitrone compound relative to all the double bonds originating from conjugated diene of the conjugated diene polymer.

12. The rubber composition for an undertread according to claim 4, wherein a degree of modification of the modified polymer is from 0.02 to 4.0 mol %,
wherein "degree of modification" represents a proportion (mol %) of double bonds modified with the nitrone compound relative to all the double bonds originating from conjugated diene of the conjugated diene polymer.

13. The rubber composition for an undertread according to claim 8, wherein a degree of modification of the modified polymer is from 0.02 to 4.0 mol %, wherein "degree of modification" represents a proportion (mol %) of double bonds modified with the nitrone compound relative to all the double bonds originating from conjugated diene of the conjugated diene polymer.

14. The rubber composition for an undertread according to claim 9, wherein a degree of modification of the modified polymer is from 0.02 to 4.0 mol %, wherein "degree of modification" represents a proportion (mol %) of double bonds modified with the nitrone compound relative to all the double bonds originating from conjugated diene of the conjugated diene polymer.

15. The rubber composition for an undertread according to claim 2, wherein an amount of the nitrone compound that is reacted with the double bond of the conjugated diene polymer is from 0.1 to 10 parts by mass per 100 parts by mass of the diene rubber.

16. The rubber composition for an undertread according to claim 3, wherein an amount of the nitrone compound that is reacted with the double bond of the conjugated diene polymer is from 0.1 to 10 parts by mass per 100 parts by mass of the diene rubber.

17. The rubber composition for an undertread according to claim 4, wherein an amount of the nitrone compound that is reacted with the double bond of the conjugated diene polymer is from 0.1 to 10 parts by mass per 100 parts by mass of the diene rubber.

18. The rubber composition for an undertread according to claim 5, wherein an amount of the nitrone compound that is reacted with the double bond of the conjugated diene polymer is from 0.1 to 10 parts by mass per 100 parts by mass of the diene rubber.

19. A rubber composition for an undertread, the rubber composition comprising: a diene rubber and a carbon black;

the diene rubber containing a natural rubber and a modified polymer that is obtained by reacting a nitrone compound having a carboxy group with a double bond of a conjugated diene polymer, wherein the conjugated diene polymer are selected from the group consisting of natural rubber, isoprene rubber, butadiene rubber, styrene-butadiene rubber, acrylonitrile-butadiene copolymer rubber, butyl rubber, and chloroprene rubber;

a content of the natural rubber in the diene rubber being 60 mass % or greater;

a content of the modified polymer in the diene rubber being from 8 to 40 mass %;

a content of the carbon black being from 30 to 67 parts by mass per 100 parts by mass of the diene rubber; and a nitrogen adsorption specific surface area of the carbon black being from 20 to 60 $m^2/g$.

\* \* \* \* \*